Patented May 8, 1934

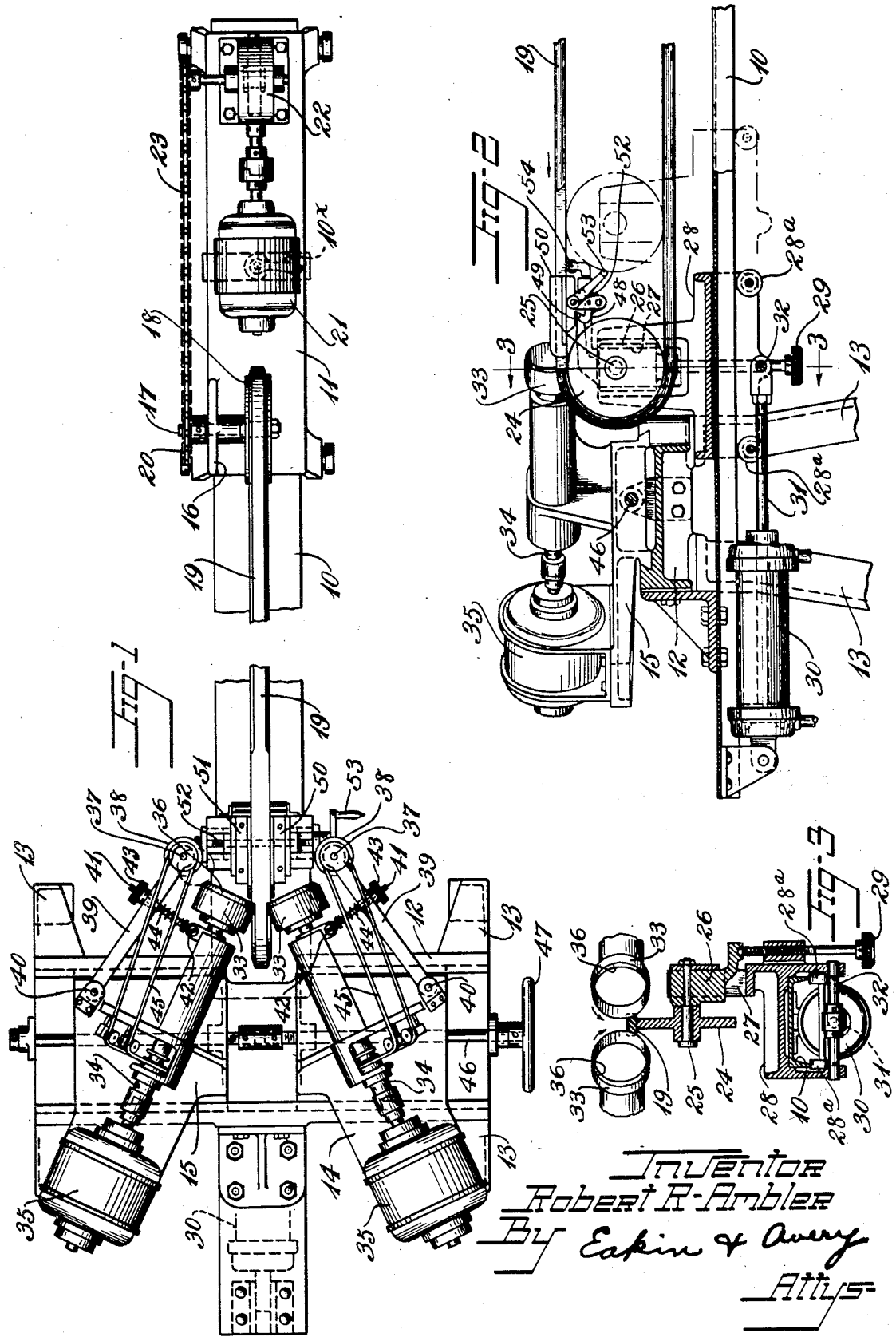

1,958,122

UNITED STATES PATENT OFFICE 1,958,122

TRIMMING MACHINE

Robert R. Ambler, Akron, Ohio, assignor to The B. F. Goodrich Company, New York, N. Y., a corporation of New York Application January 17, 1933, Serial No. 652,141

9 Claims. (Cl. 164—61)

This invention relates to trimming machines and is especially useful where opposite edges of a band of material are to be simultaneously trimmed. The device may be used for trimming belts during the manufacture thereof.

In the manufacture of endless belts having a trapezoidal cross-section and commonly called V-belts it is customary to build the belts by superimposing ply upon ply of fabric and unvulcanized rubber upon a pattern belt and thereafter slitting the superimposed material to provide a plurality of belt cores. These cores are thereafter covered by an enveloping ply of fabric and are cured in molds. When the cores produced by straight cuts are rectangular in cross-section, great distortion of the material may occur in molding them to trapezoidal form. When angular cuts are made to produce trapezoidal cores, the waste material between adjacent cores, which cannot be used for belts because of its being tapered the wrong way, is excessive. By using the trimming device of this invention to convert the rectangular cross-section cores to trapezoidal shape, distortion of the cores during the molding of a cover thereon is avoided and the belts made with a minimum of waste material.

The principal objects of the invention are to provide simplicity, speed, and economy in a trimming machine, to provide for simultaneous trimming on two edges of an extensive article, and to provide means for assisting in the production of trapezoidal belts and the like.

Other objects will appear from the following description and the accompanying drawing.

In the drawing:

Fig. 1 is a plan view of the device, part of the device being broken away to shorten the drawing.

Fig. 2 is a side view of the trimming end of the device, parts being broken away, and the device shown partly in section.

Fig. 3 is a sectional detail view taken on line 3—3 of Fig. 2.

Referring to the drawing, the numeral 10 designates the principal frame member of the machine, which member is in the form of a channel of structural steel horizontally disposed and supported at one end by a movable frame member 11, and at the other by a stationary frame member 12 extending laterally thereof.

Frame member 12 is supported by legs 13 and is provided with a machined guideway in its upper face in which a pair of carriages 14, 15 are slidably fitted. Frame member 11 is adjustable along channel 10, being clamped thereto by a clamp 10ˣ, and is provided with a pedestal bearing 16 in which a rotatable shaft 17 is journaled. A pulley 18, for supporting and driving a belt 19 to be trimmed, and a sprocket wheel 20, are fixed to shaft 17. A motor 21 mounted on frame member 10 drives shaft 17 through a speed reducer 22 and a sprocket chain 23.

An idler pulley 24 for cooperating with pulley 18 in supporting the belt under tension is arranged in alignment with pulley 18 on a shaft 25 mounted on a carriage 28 which is adapted to slide along frame member 10. Provision is made for vertically adjusting pulley 24 by mounting its shaft in a block 26 adjustably retained in a vertical guideway 27 formed in carriage 28. An elevating screw 29 may be used to adjust block 26 in its guideway. Rollers 28ª attached to carriage 28 extend under the frame member 10 to retain the carriage thereon.

A fluid pressure cylinder 30 is attached to the underside of frame member 10 and has its piston rod 31 connected to carriage 28 as at 32. Fluid under pressure may be admitted to either end of the cylinder to propel the carriage in either direction along the frame member according to whether the belt 19 is to be tensioned or released.

Each carriage 14 and 15 supports a trimming device of similar construction, each of which may be described as comprising a rotatable cylindrical knife 33 mounted on a shaft 34 at an acute angle to the belt 19 and driven by an electric motor 35. The leading edge of the knife is sharpened at a bevel 36.

To provide for sharpening of the knife, a grinding spindle 37, carrying an abrasive wheel 38, is rotatably mounted in an arm 39 pivoted at 40 to carriage 15. A screw 41 is pivoted at 42 to the carriage 15 and passes through the arm 39. A nut 43 is threaded on the screw to adjust the abrasive wheel against the cutter 33. A spring 44 acts against the nut to hold the abrasive wheel away from the cutter. Spindle 37 is driven from shaft 34 by a belt 45.

Carriages 14 and 15 may be adjusted toward and from each other by a right and left screw shaft 46 operable by a handwheel 47.

In order to properly align the belt with the trimming knives, block 26 which supports the shaft 25, is provided with an arm 48 having a dovetailed slot 49 in which a pair of guide blocks 50, 51, are slidably adjustable. A right and left screw 52 journaled in arm 48 and operable by a handle 53 may be used simultaneously to move guides 50, 51 to center the belt. An idler roller 54 carried by arm 48 underlies the belt 19 and guides the under surface of the belt.

In operation the device is adjusted so that pulleys 18 and 24 will hold the belt 19, when tensioned, in operative relation to the trimming knives 33 as shown in Figs. 1 and 2. When air is admitted to cylinder 30 at the left side as viewed in Fig. 2 the carriage 28 is moved to the dot and dash position where a belt 19 may be removed from or placed around pulleys 18 and 24. After a belt has been placed on the pulleys, air is exhausted from the left end of the cylinder and admitted to the right end to tension the belt. Motors 35 having previously been started, as the belt is tensioned the knives 33 will enter the edges of the belt. After tensioning belt 19, motor 21 is started and feeds the belt past the cutters, progressively trimming the belt to trapezoidal form.

The included angle of the belt sides may be changed by elevating or lowering the block 26 by the screw 29 and the width of the belt may be adjusted by operating the screw 46, the guides 50 and 51 being adjusted to suit the width of the belt.

Should knives 33 become dull during use they may be sharpened in place while operating on the belt by adjustment of nuts 43.

While the device has been described as used in angularly trimming an endless belt it is apparent that it may also be used to trim a thin rind at the edges of a flat belt or other band of material.

I claim:

1. A trimming machine comprising means for tensioning and advancing an endless strip having a substantially rectangular cross section, means located at a single station for simultaneously and progressively trimming the opposite edges of the strip at an angle to their original planes, and means for adjusting said trimming means to change the angle of trim.

2. A trimming machine comprising means for tensioning and advancing an endless strip having a substantially rectangular cross-section, means located at a single station for simultaneously and progressively trimming the opposite edges of the strip at an angle to their original planes, and means for adjusting said trimming means to change the width of the resulting article.

3. A trimming machine comprising a pair of spaced pulleys for supporting and driving an endless band of material, means for adjusting one of the pulleys for tensioning the band, a pair of trimming devices adjacent the edges of one reach of the band and adapted to shave said edges, and means for guiding said band to said trimming devices.

4. A trimming machine comprising a pair of spaced pulleys for supporting and driving an endless band of material, means for adjusting one of the pulleys for tensioning the band, and a pair of trimming devices adjacent the opposite edges of one reach of the band, each comprising a power driven cylindrical knife having a sharpened edge disposed tangentially to an edge of the band and adapted to shave the same.

5. A trimming machine comprising a pair of spaced pulleys for supporting and driving an endless band of material, means for adjusting one of the pulleys for tensioning the band, and a pair of trimming devices adjacent the opposite edges of one reach of the band, each comprising a power driven cylindrical knife having a sharpened edge disposed tangentially to an edge of the band and adapted to shave the same, and means for adjusting the relation of said trimming device to the edges of the band.

6. A trimming machine comprising a pair of spaced pulleys for supporting and driving an endless band of material, means for adjusting one of the pulleys to tension the band, a pair of trimming devices between which one reach of the band is directed, each device comprising a rotatable blade adapted to shave an edge of the band, and means for adjusting the angular relation of the blades to the band.

7. A trimming machine comprising a pair of spaced pulleys for supporting and driving an endless band of material, means for adjusting one of the pulleys to tension the band, a pair of trimming devices between which the band is directed, each device comprising a rotatable blade adapted to shave an edge of the band at an angle acute to the driving face of the band, and means for adjusting the relation of the blades to the band to change the angle of cut.

8. A trimming machine comprising a belt supporting structure including a driven pulley and an idler pulley spaced from each other, a pair of trimming devices adapted to trim opposite edges of one reach of a belt supported thereon, and means for moving said idler pulley away from said driven pulley to tension a belt supported by said pulleys and to bring said belt into engagement with said trimming devices.

9. A trimming device comprising a belt supporting structure including a plurality of belt supporting pulleys and means for driving at least one of said pulleys, a pair of trimming devices adapted to engage opposite edges of one reach of a belt supported thereon, and means for moving one of the pulleys to tension the belt and to bring the edges thereof into engagement with said trimming devices.

ROBERT R. AMBLER.